(12) United States Patent
Lopez et al.

(10) Patent No.: US 9,472,365 B1
(45) Date of Patent: Oct. 18, 2016

(54) RELAY SYSTEM HAVING DUAL RELAYS CONFIGURED AS HEAT SINKS FOR ONE ANOTHER

(71) Applicant: Lear Corporation, Southfield, MI (US)

(72) Inventors: Adrian Lopez, Southfield, MI (US); Aric Henderson Anglin, Rives Junction, MI (US); Christopher Patalon, Southfield, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 14/716,249

(22) Filed: May 19, 2015

(51) Int. Cl.
| | | |
|---|---|---|
| *H02J 7/00* | (2006.01) | |
| *H01H 45/12* | (2006.01) | |
| *B60L 11/18* | (2006.01) | |
| *H01H 45/02* | (2006.01) | |

(52) U.S. Cl.
CPC .......... *H01H 45/12* (2013.01); *B60L 11/1818* (2013.01); *H01H 45/02* (2013.01); *H01H 2231/026* (2013.01)

(58) Field of Classification Search
CPC ..... H02J 7/0031; H02J 7/0093; H02J 7/0016
USPC .......................................... 320/109, 134, 118
See application file for complete search history.

(56) References Cited

U.S. PATENT DOCUMENTS

| | | | | |
|---|---|---|---|---|
| 489,597 | A * | 1/1893 | Badt .................. | B60M 1/08 191/17 |
| 3,676,623 | A * | 7/1972 | Hollister ............ | H01H 1/58 200/293 |
| 5,019,957 | A * | 5/1991 | Wilkinson ......... | H02M 1/34 361/111 |
| 6,078,491 | A * | 6/2000 | Kern .................. | H01H 50/021 361/167 |
| 8,981,264 | B2 * | 3/2015 | Seger ................. | F02M 31/13 123/549 |
| 2002/0050805 | A1 * | 5/2002 | Petrovic ............. | H02J 7/0093 320/130 |
| 2003/0161104 | A1 * | 8/2003 | Hartzell ............. | F28F 1/045 361/699 |
| 2004/0002238 | A1 | 1/2004 | Kim | |
| 2005/0242779 | A1 * | 11/2005 | Yoshio ............... | H02J 7/0031 320/134 |
| 2006/0040526 | A1 | 2/2006 | Shirota | |
| 2006/0040527 | A1 | 2/2006 | Shirota | |
| 2006/0050464 | A1 | 3/2006 | Von Arx et al. | |
| 2008/0247133 | A1 | 10/2008 | Ito | |
| 2008/0266810 | A1 | 10/2008 | Tiedemann et al. | |
| 2008/0310121 | A1 | 12/2008 | Yamashita et al. | |
| 2009/0023313 | A1 | 1/2009 | Hayakawa | |
| 2011/0181377 | A1 * | 7/2011 | Vanhille ............. | H01P 1/30 333/245 |
| 2012/0221288 | A1 * | 8/2012 | Ioannidis ........... | G01N 25/18 702/136 |
| 2012/0244398 | A1 * | 9/2012 | Youngs .............. | B60K 6/28 429/61 |
| 2012/0263940 | A1 * | 10/2012 | Arzberger et al. . | C09K 5/14 428/328 |
| 2013/0074985 | A1 * | 3/2013 | Ferguson ........... | B67D 7/348 141/98 |

(Continued)

*Primary Examiner* — Richard Isla Rodas
*Assistant Examiner* — Dung V Bui
(74) *Attorney, Agent, or Firm* — Brooks Kushman P.C.

(57) ABSTRACT

A system includes first and second relays which physically adjoin one another and are controlled such that one of the relays is off whenever the other relay is on. In operation, heat generated in the first relay thermally conducts to the second relay where the relays physically adjoin one another whereby the second relay functions as a heat sink for the first relay while the second relay is off and the first relay is on. Correspondingly, in operation, heat generated in the second relay thermally conducts to the first relay where the relays physically adjoin one another whereby the first relay functions as a heat sink for the second relay while the first relay is off and the second relay is on.

8 Claims, 3 Drawing Sheets

(56) References Cited

U.S. PATENT DOCUMENTS

| | | |
|---|---|---|
| 2013/0119908 A1 | 5/2013 | Harada et al. |
| 2013/0161316 A1* | 6/2013 | Bohlender ........... B60H 1/2215 219/531 |
| 2014/0132217 A1* | 5/2014 | Kim ..................... H02J 7/0016 320/118 |
| 2014/0327402 A1* | 11/2014 | Hung ........................ H02J 7/14 320/128 |
| 2014/0339891 A1* | 11/2014 | Ohkawa ................ H01M 10/44 307/9.1 |
| 2015/0044549 A1* | 2/2015 | Tutunaru ............ B60L 11/1866 429/188 |
| 2015/0283963 A1* | 10/2015 | Janarthanam ......... B60R 16/033 307/9.1 |

* cited by examiner

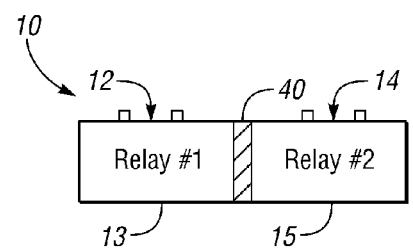
FIG. 3
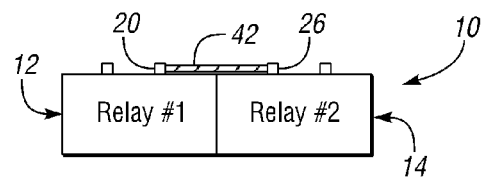
FIG. 4
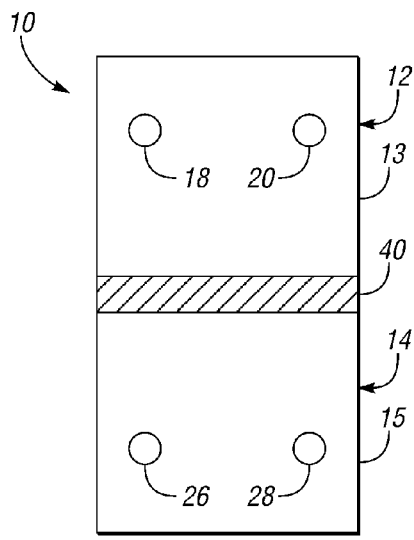 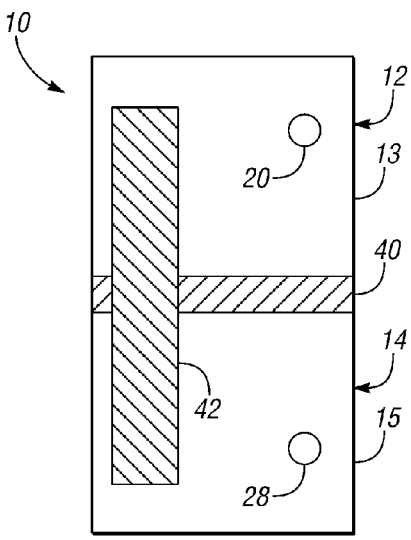
FIG. 5A    FIG. 5B

RELAY SYSTEM HAVING DUAL RELAYS CONFIGURED AS HEAT SINKS FOR ONE ANOTHER

TECHNICAL FIELD

The present disclosure relates to relay systems having dual relays.

BACKGROUND

A relay is a switch. In use, for example, a relay is connected at one end to a source and at another end to a load. When switched on, the relay is closed and connects the source to the load. In this case, electrical energy (e.g., current) may flow from the source through the relay to the load. When switched off, the relay is opened and disconnects the source from the load. In this case, no current may flow from the source to the load via the relay. This is because the source and the load are electrically isolated from one another by the relay.

Current flowing through a relay generates heat. Some of the heat transfers away from the relay. The heat dissipates through the relay system until thermal equilibrium is achieved. A problem occurs when the thermal equilibrium temperature is higher than what the relay system components can handle. In this case, the relay can malfunction and/or melt. Remedies include limiting the current flow such that heat generates slower than can be transferred away from the relay and/or employing a physically larger relay such that more heat can be transferred away from the relay. Both remedies have undesired attributes.

SUMMARY

A system includes a first relay and a second relay. The relays physically adjoin one another and are controlled such that one of the relays is off whenever the other relay is on.

In operation, some of the heat generated in the first relay thermally conducts to the second relay where the relays physically adjoin one another whereby the second relay functions as a heat sink for the first relay while the second relay is off and the first relay is on.

Correspondingly, in operation, some of the heat generated in the second relay thermally conducts to the first relay where the relays physically adjoin one another whereby the first relay functions as a heat sink for the second relay while the first relay is off and the second relay is on.

Housings of the relays may be in physical contact with one another for the relays to physically adjoin one another. The housings may be in physical contact with one another through a thermal pad (e.g., thermal interface material with high thermal conductivity). The housings may have the same physical size or different physical sizes.

A thermal jumper (e.g., a thermally conductive, but electrically insulated component) may be connected between a terminal of the first relay and a terminal of the second relay such that the relays are in further physical contact with one another.

At least one of the relays may have a current, power, or volt-ampere rating and the at least one of the relays may be operated above the rating.

The relays may be of an identical type of relay or may be of different types of relays.

An on-board charging system for an electric vehicle having a traction battery and a powertrain includes a first relay, a second relay, and a controller. The first relay is for transferring current from an off-board charging station to the traction battery to charge the traction battery. The second relay is for transferring current from the traction battery to the powertrain to propel the vehicle. The relays physically adjoin one another. The controller is configured to control the relays such that during battery charging the first relay is on and the second relay is off and during vehicle propulsion the second relay is on and the first relay is off.

BRIEF DESCRIPTION OF THE DRAWINGS

FIG. 2B illustrates a block diagram of the electrical connections of the relay system in the electric vehicle charging system during a vehicle driving operation in which the first relay is off and the second relay is on;

FIG. 3 illustrates a block diagram of the first and second relays physically connected together with a thermal pad;

FIG. 4 illustrates a block diagram of the first and second relays physically connected together with a thermal jumper;

FIG. 5A illustrates a top side view of the first and second relays physically connected together with a thermal pad;

FIG. 5B illustrates a top side view of the first and second relays physically connected together with a thermal pad and a thermal jumper.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
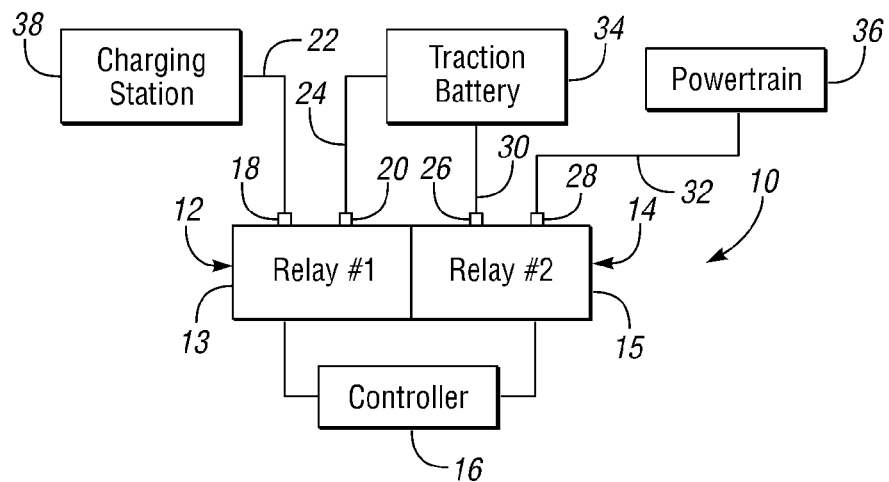
FIG. 1 illustrates a block diagram of a relay system having a first relay and a second relay physically connected to one another such that each relay functions as a heat sink for the other relay.

Referring now to FIG. 1, a block diagram of a relay system 10 is shown. Relay system 10 includes a first relay 12 and a second relay 14. As will be described in greater detail, first and second relays 12 and 14 are physically connected to one another such that each relay functions as a heat sink for the other relay. During operation of relay system 10, relays 12 and 14 are controlled such that one of the relays is off whenever the other relay is on.

In a first operating condition, second relay 14 is off whenever first relay 12 is on. In this case, current may flow through first relay 12. Current flowing through first relay 12 generates heat in the first relay. Some of the heat transfers away through the first relay's main heat sink (i.e., buss bars and/or wires connected to first relay 12). Because first and second relays 12 and 14 are physically connected to one another, some of the heat also transfers to second relay 14. This portion of the transferred heat is dissipated through the second relay's main heat sink (i.e., buss bars and/or wires connected to second relay 14). Accordingly, second relay 14 (i.e., the unpowered relay) functions as a heat sink for first relay 12 (i.e., the powered relay). As first and second relays 12 and 14 are physically connected together and operate under the condition that one of the relays is off whenever the other relay is on, the relays function as a single physically larger relay in regards to heat sinking capabilities. In this way, first relay 12 can handle more current than the first relay by itself would be able to handle. This is because the increased heat resulting from more current can be handled by the physically connected first and second relays 12 and 14.

Likewise, in a second operating condition, first relay 12 is off whenever second relay 14 is on. In this case, current may flow through second relay 14. Current flowing through second relay 14 generates heat in the second relay. Some of the heat transfers away through the second relay's main heat sink. Because first and second relays 12 and 14 are physically connected to one another, some of the heat also transfers to first relay 12. This portion of the transferred heat is dissipated through the first relay's main sink. Accordingly, first relay 12 (i.e., the unpowered relay) functions as a heat sink for second relay 14 (i.e., the powered relay). Again, by first and second relays 12 and 14 being physically connected together and operating under the condition that one of the relays is off whenever the other relay is on, the relays function as a single physically larger relay in regards to heat sinking capabilities. In this way, second relay 14 can handle more current than the second relay by itself would be able to handle. This is because the increased heat resulting from more current can be handled by the physically connected first and second relays 12 and 14.

Relay system 10 further includes a controller 16. Controller 16 is configured to control the switching of first and second relays 12 and 14. Controller 16 controls the switching of first and second relays 12 and 14 according to the condition that one of the relays is off whenever the other relay is on.

First and second relays 12 and 14 may be identical relays or different relays from one another. First and second relays 12 and 14 may have the same or different physical sizes regardless of whether the relays are of the same or different types from one another.

In the exemplary embodiment, first and second relays 12 and 14 are identical electromechanical or electromagnetic relays having the same structure and physical size. First relay 12 includes a housing 13 in which its relay components are contained. Housing 13 with the relay components contained therein form the body of first relay 12. Heat generated within the body of first relay 12 transfers away from housing 13 into the external environment. As such, the body of first relay 12 functions as a heat sink. Likewise, second relay 14 includes a housing 15 in which its relay components are contained. Housing 15 with the relay components contained therein form the body of second relay 14. Heat generated within the body of second relay 14 transfers away from housing 15 into the external environment. As such, the body of second relay 14 functions as a heat sink.

In the exemplary embodiment, first and second relays 12 and 14 are physically connected to one another by the bodies of the relays physically contacting one another. For instance, as indicated in the block diagram of FIG. 1, sides of housings 13 and 15 facing one another are physically adjoined and contact one another whereby first and second relays 12 and 14 are physically connected to one another.

First relay 12 includes a first terminal or contactor ("terminal") 18 and a second terminal 20. Terminals 18 and 20 are electrically conductive metallic components. Terminals 18 and 20 are electrically connected to respective input/output ends of the relay components contained within housing 13 of first relay 12.

A first electrically conductive component such as a copper buss bar or wire ("electrical connector") 22 is physically attached at one end to first terminal 18 and a second electrical connector 24 is physically attached at one end to second terminal 20. Terminals 18 and 20, and thereby electrical connectors 22 and 24, are electrically connected together through first relay 12 when the first relay is on. Correspondingly, terminals 18 and 20, and thereby electrical connectors 22 and 24, are electrically disconnected from one another through first relay 12 when the first relay is off.

As indicated, electrical connectors 22 and 24 (e.g., buss bars and/or wires) are metal components such as copper for conducting electrical current. As such, electrical connectors 22 and 24 are thermal conductors and also function as heat sinks. The heat sinking capabilities of connectors 22 and 24 generally depend on their physical size and material properties (e.g., thermal conductivity and electrical resistivity).

Second relay 14 includes a third terminal 26 and a fourth terminal 28. Like terminals 18 and 20, terminals 26 and 28 are electrically conductive metallic components which are thermally conductive. Terminals 26 and 28 are connected to respective input/output ends of the relay components contained within housing 15 of second relay 14. A third electrical connector 30 is physically attached at one end to third terminal 26 and a fourth electrical connector 32 is physically attached at one end to fourth terminal 28. Terminals 26 and 28, and thereby electrical connectors 30 and 32, are electrically connected together through second relay 14 when the second relay is on. Correspondingly, terminals 26 and 28, and thereby electrical connectors 30 and 32, are electrically disconnected from one another through second relay 14 when the second relay is off.

Like first and second electrical connectors 22 and 24, third and fourth electrical connectors 30 and 32 are metal components (e.g., buss bars and/or wires) such as copper for conducting electrical current and also function as heat sinks. The heat sinking capabilities of electrical connectors 30 and 32 generally depend on their physical size and material properties (e.g., thermal conductivity and electrical resistivity).

As shown in FIG. 1, in the exemplary embodiment, relay system 10 is part of an on-board electric vehicle charging system. As such, relay system 10 is in an electric vehicle having a traction battery 34 and a powertrain 36 having a traction motor. Second electrical connector 24 of first relay 12 is connected to traction battery 34; third electrical connector 30 of second relay 14 is connected to the traction battery; and fourth electrical connector 32 of the second relay is connected to powertrain 36. The vehicle may be driven by supplying electrical energy from traction battery 34 to powertrain 36 via second relay 14 when the second relay is on.

The electric vehicle charging system is operable with a charging station 38 for charging traction battery 34. Charging station 38 includes a source of electrical energy. The vehicle is parked at charging station 38 in order for charging station 38 to charge traction battery 34. First electrical connector 22 of first relay 12 is connected to charging station 38 (e.g., a plug of the charging station is plugged into a plug receptacle of the first connector) in order to draw electrical energy from the charging station for charging traction battery 34. Traction battery 34 is charged by supplying electrical energy from charging station 38 to traction battery 34 via first relay 12 when the first relay is on.

As described, the charging operation includes charging traction battery 34 with electrical energy from charging station 38 and the driving operation includes supplying powertrain 36 with electrical energy from the traction battery. First and second relays 12 and 14 are controlled according to the condition that the charging and driving operations are mutually exclusive. That is, one of relays 12 and 14 is off whenever the other one of the relays is on pursuant to the condition that the charging and driving operations are mutually exclusive.

For instance, during charging, first relay 12 is on and second relay 14 is off. As first relay 12 is on, current may flow from charging station 38 through the first relay to traction battery 34. However, as second relay 14 is off, current may not flow from traction battery 34 through the second relay to powertrain 36.

Correspondingly, during driving, second relay 14 is on and first relay 12 is off. As second relay 14 is on, current may flow from traction battery 34 through second relay 14 to powertrain 36. However, as first relay 12 is off, current may not flow from charging station 38 through the first relay to traction battery 34.

Figure 2A:
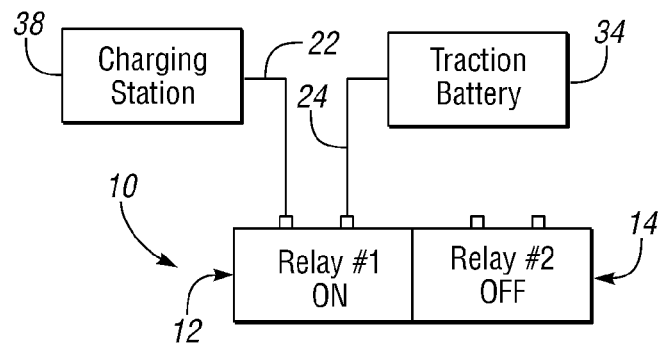
FIG. 2A illustrates a block diagram of the electrical connections of the relay system in an electric vehicle charging system during a charging operation in which the first relay is on and the second relay is off.

Referring now to FIG. 2A, with continual reference to FIG. 1, a block diagram of the electrical connections of relay system 10 in the electric vehicle charging system during the charging operation is shown. As described, during the charging operation, first relay 12 is on and second relay 14 is off. First electrical connector 22 of first relay 12 is connected to charging station 38 to enable the charging operation. As first relay 12 is on, first and second electrical connectors 22 and 24, and thereby charging station 38 and traction battery 34, are electrically connected together through the first relay. Current from charging station 38 flows through first relay 12 to traction battery 34.

As second relay 14 is off, traction battery 34 and powertrain 36 are electrically disconnected from one another by the second relay. This is indicated in FIG. 2A with the following not being shown: third electrical connector 30 connected between second relay 14 and traction battery 36; fourth electrical connector 32 connected between the second relay and powertrain 36; and the powertrain itself.

The current from charging station 38 flowing to traction battery 34 through first relay 12 generates heat in the first relay. As first and second relays 12 and 14 are physically connected to one another, some of the heat thermally conducts from the body of the first relay to the body of the second relay. The heat thereby dissipates through first and second relays 12 and 14 and their heat sinks resulting in a reduced thermal equilibrium temperature. Accordingly, second relay 14 (i.e., the unpowered relay) functions as a heat sink for first relay 12 (i.e., the powered relay).

As such, the physically connected first and second relays 12 and 14 effectively provide a single physically larger relay. For instance, assuming that the body and electrical connectors of first relay 12 have the same physical dimensions as the body and electrical connectors of second relay 14, the physically connected first and second relays 12 and 14 can transfer away more heat than the first relay alone. In this way, the current flow through first relay 12 does not have to be limited as the physically connected first and second relays 12 and 14 can transfer away more heat than the first relay alone. Likewise, a physically larger first relay 12 does not have to be employed as the physically connected first and second relays 12 and 14 in conjunction effectively provide a physically larger relay.

Figure 2B:
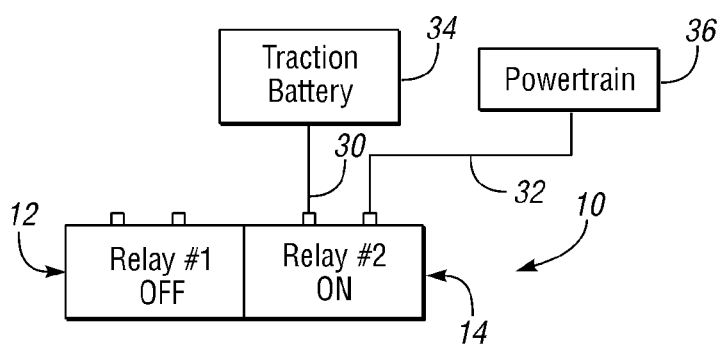

Referring now to FIG. 2B, with continual reference to FIGS. 1 and 2A, a block diagram of the electrical connections of relay system 10 in the electric vehicle charging system during the vehicle driving operation is shown. As described, during the driving operation, first relay 12 is off and second relay 14 is on. As second relay 14 is on, third and fourth electrical connectors 30 and 32, and thereby traction battery 34 and powertrain 36, are electrically connected together through the second relay. Current from traction battery 34 flows through second relay 14 to powertrain 36.

As first relay 12 is off, charging station 38 and traction battery 34 are electrically disconnected from one another by the first relay. This is indicated in FIG. 2B with the following not being shown: first electrical connector 22 connected between first relay 12 and charging station 38; the charging station itself; and second electrical connector 24 connected between the first relay and traction battery 34.

The current from traction battery 34 flowing to powertrain 36 through second relay 14 generates heat in the second relay. As first and second relays 12 and 14 are physically connected together, some of the heat thermally conducts from the body of the second relay to the body of the first relay. The heat thereby dissipates through first and second relays 12 and 14 and their heat sinks resulting in a reduced thermal equilibrium temperature. Accordingly, first relay 12 (i.e., the unpowered relay) functions as a heat sink for second relay 14 (i.e., the powered relay).

As described, the current flow through second relay 14 does not have to be limited as the physically connected first and second relays 12 and 14 can transfer away more heat than the second relay alone. Likewise, a physically larger second relay 14 does not have to be employed as the physically connected first and second relays 12 and 14 in conjunction effectively provide a physically larger relay.

Referring now to FIG. 3, with continual reference to FIG. 1, a block diagram of first and second relays 12 and 14 physically connected together with a thermal pad 40 is shown. Thermal pad 40 is physically between adjoining sides of housings 13 and 15 of first and second relays 12 and 14. As such, these sides of the bodies of first and second relays 12 and 14 facing one another are physically connected to one another through thermal pad 40 whereby the first and second relays are physically connected to one another. Thermal pad 40 has thermal transfer characteristics which support heat conduction between the bodies of first and second relays 12 and 14. In this way, heat generated in one relay can be conducted through thermal pad 40 to the other relay.

Referring now to FIG. 4, with continual reference to FIG. 1, a block diagram of first and second relays 12 and 14 physically connected together with a thermal jumper (i.e., a thermally conductive, but electrically insulated component) 42 is shown. Thermal jumper 42 is connected between second terminal 20 of first relay 12 and third terminal 26 of second relay 14. Thermal jumper 42 functions as a heat sink. Heat generated in one relay may be thermally conducted from the body of the relay to thermal jumper 42 and then be transferred away from the thermal jumper into the external environment and other attached heat sinks.

Referring now to FIG. 5A, with continual reference to FIGS. 1 and 3, a top side view of first and second relays 12 and 14 physically connected together with thermal pad 40 is shown.

Referring now to FIG. 5B, with continual reference to FIGS. 1, 3, and 4, a top side view of first and second relays 12 and 14 physically connected together with thermal pad 40 and thermal jumper 42 is shown.

Figure 6:
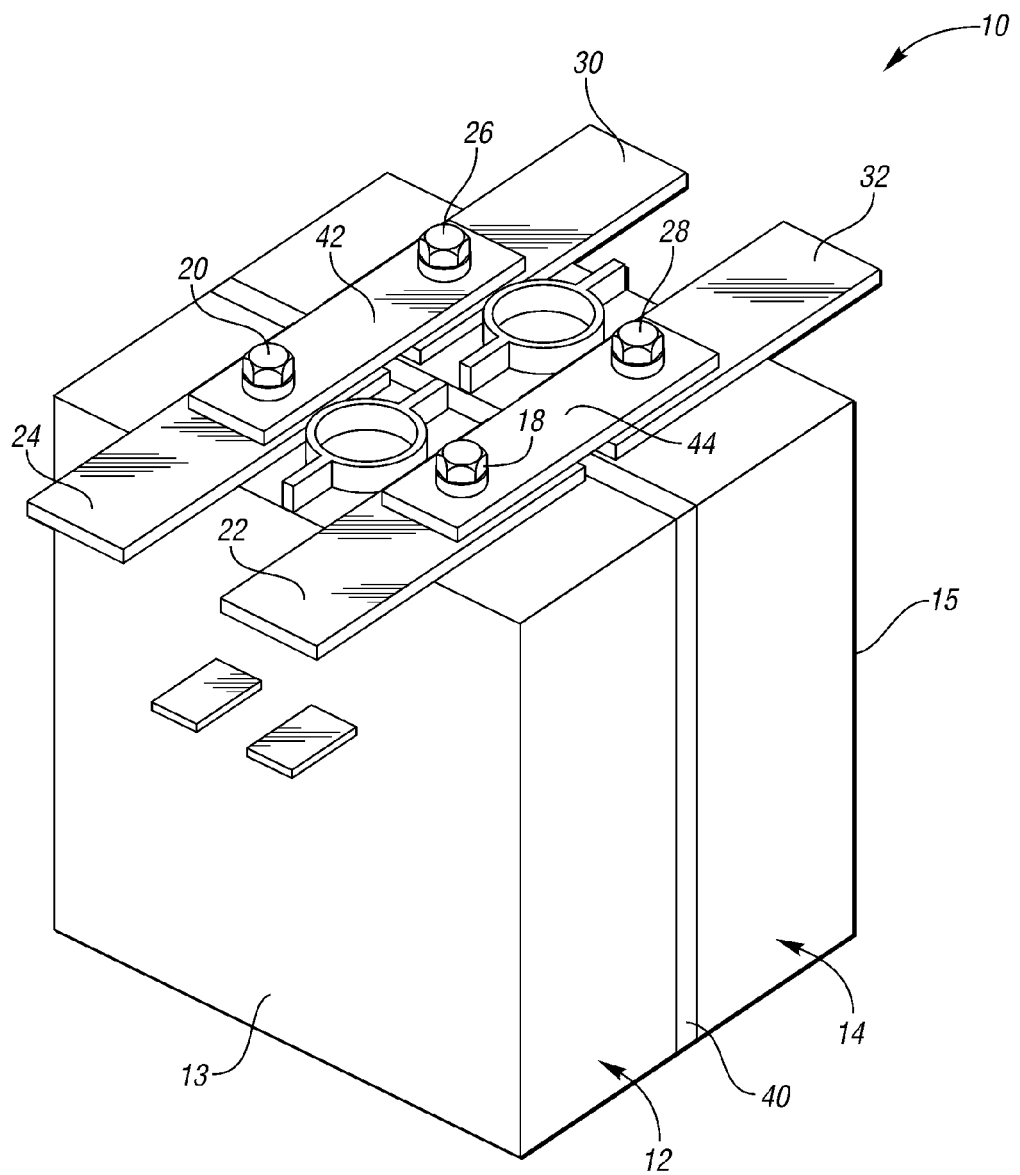
FIG. 6 illustrates a perspective view of the relay system.

Referring now to FIG. 6, a perspective view of relay system 10 is shown. In this variation of relay system 10, housings 13 and 15 of first and second relays 12 and 14, respectively, are physically connected together with thermal pad 40. Thermal jumper 42 is connected between second terminal 20 of first relay 12 and third terminal 26 of second relay 14. As described, heat generated in one relay may be thermally conducted from the body of the relay to thermal jumper 42 and then be transferred away from the thermal jumper into the external environment and attached heat sinks. A second thermal jumper 44 is connected between first and fourth terminals 18 and 28 of first and second relays 12 and 14, respectively. Similarly, heat generated in one relay may be thermally conducted from the body of the relay to second thermal jumper 44 and then be transferred away from the second thermal jumper into the external environment and attached heat sinks.

In summary, relay system 10 includes first and second relays 12 and 14 which physically adjoin and/or physically connect with one another such that each relay functions as a heat sink for the other relay. In operation, one of the relays is off whenever the other relay is on. When first relay 12 is on (i.e., the powered relay) and second relay 14 is off (i.e., the unpowered relay), at least some of the heat generated in the first relay thermally conducts where the relays physically adjoin one another from the first relay to the second relay. This heat transfers away from the second relay into the external environment and attached heat sinks. As such, the second relay functions as a heat sink for the first relay. Correspondingly, when second relay 14 is on (i.e., the powered relay) and first relay 12 is off (i.e., the unpowered relay), at least some of the heat generated in the second relay thermally conducts where the relays physically adjoin another from the second relay to the first relay. This heat transfers away from the first relay into the external environment and attached heat sinks. As such, first relay 12 functions as a heat sink for second relay 14.

In a variation, housing (e.g., body) 13 of first relay 12 and housing 15 of second relay 14 are in physical contact with one another such that the relays physically adjoin one another. Housings 13 and 15 are connected or joined with one another such as through mechanical fasteners or adhesives. Housings 13 and 15 may be in direct contact with one another or a thermal pad 40 may be positioned between the contacting housing sides. Heat in one relay thermally conducts across the contacting housing sides to the other relay and transfers away from the other relay.

In a variation, thermal jumper 42 is connected to terminals 20 and 26 of the first and second relays. Thermal jumper 42 thereby physically connects the relays together. Heat in one relay thermally conducts across thermal jumper 42 to the other relay and transfers into the environment and attached heat sinks.

Using relays 12 and 14 as heat sinks for one another may allow relay 12 and/or relay 14 to be selected with a lower current, power, and/or volt-ampere rating than would ordinarily be used in the same application, which could save cost and weight. That is, the relay could be operated above its current, power, and/or volt-ampere rating.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A system comprising:
  a first relay;
  a second relay;
  wherein the relays physically adjoin one another and are controlled such that one of the relays is off whenever the other relay is on; and
  wherein heat generated in the first relay thermally conducts to the second relay where the relays physically adjoin one another whereby the second relay functions as a heat sink for the first relay while the second relay is off and the first relay is on.

2. The system of claim 1 wherein:
  heat generated in the second relay thermally conducts to the first relay where the relays physically adjoin one another whereby the first relay functions as a heat sink for the second relay while the first relay is off and the second relay is on.

3. The system of claim 1 wherein:
  the first relay includes a housing and the second relay includes a housing, and the housings of the relays are in physical contact with one another for the relays to physically adjoin one another.

4. The system of claim 3 further comprising:
  a thermal pad; and
  wherein the housings of the relays are in physical contact with one another through the thermal pad.

5. The system of claim 3 wherein:
  the housings of the relays have a same physical size.

6. The system of claim 3 wherein:
  the housings of the relays have different physical sizes.

7. The system of claim 1 further comprising:
  a thermal jumper; and
  wherein the thermal jumper is connected between a terminal of the first relay and a terminal of the second relay such that the relays are in further physical contact with one another.

8. The system of claim 1 wherein:
  at least one of the relays has a current, power, or volt-ampere rating and the at least one of the relays is operated above the rating.

* * * * *